Jan. 5, 1943.　　　　K. A. OPLINGER　　　　2,307,535
SWITCHING APPARATUS
Filed April 5, 1941　　　　2 Sheets-Sheet 1
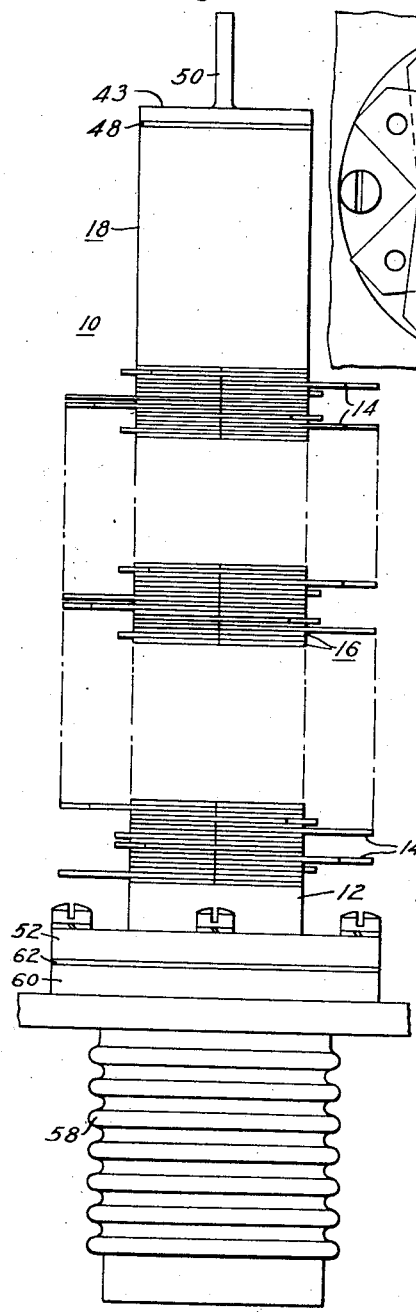
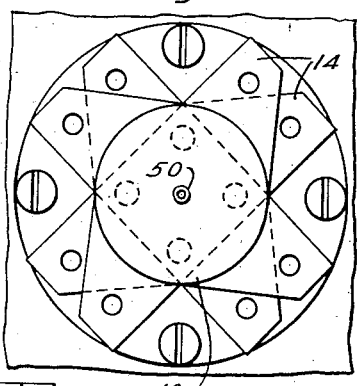
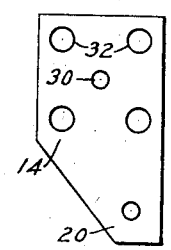
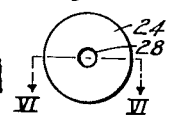
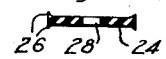
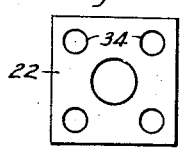
WITNESSES:
INVENTOR
Kirk A. Oplinger.
BY
ATTORNEY Jan. 5, 1943.   K. A. OPLINGER   2,307,535
SWITCHING APPARATUS
Filed April 5, 1941   2 Sheets-Sheet 2
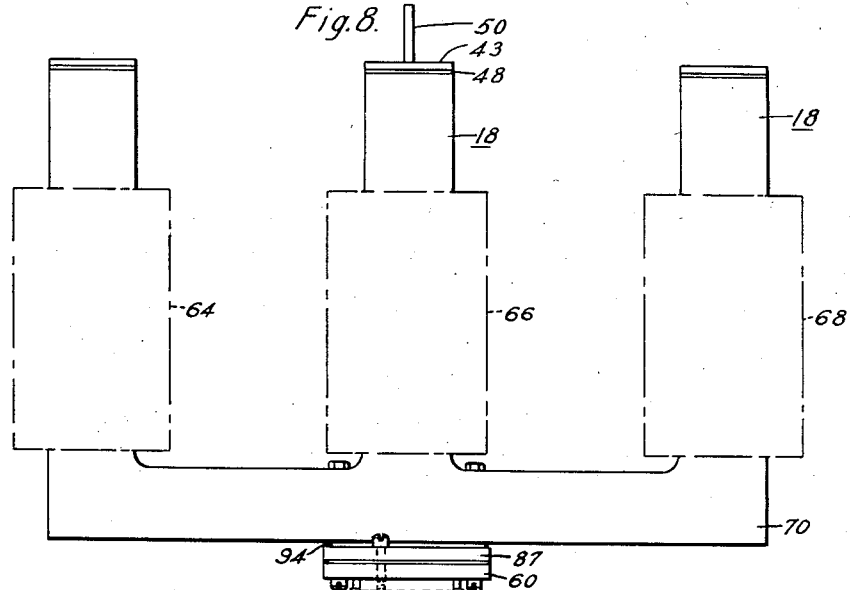
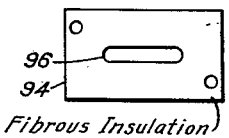
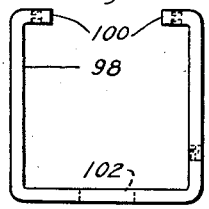
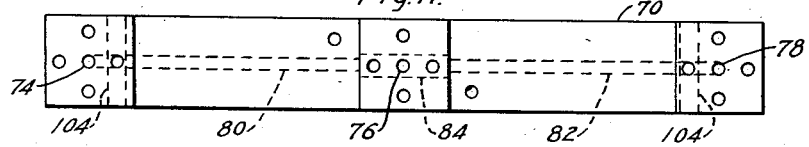
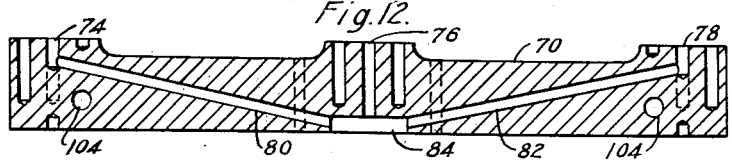
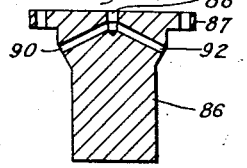
WITNESSES:
INVENTOR
Kirk A. Oplinger.
BY
ATTORNEY Patented Jan. 5, 1943

2,307,535

UNITED STATES PATENT OFFICE 2,307,535

SWITCHING APPARATUS

Kirk A. Oplinger, Verona, Pa., assignor to Westinghouse Electric & Manufacturing Company, East Pittsburgh, Pa., a corporation of Pennsylvania Application April 5, 1941, Serial No. 387,098

16 Claims. (Cl. 200—152)

This invention relates to electrical switching apparatus.

The object of the invention is to provide in a switching apparatus a well for the switching fluid made up of contact members and insulating spacers bonded together with a suitable bonding material.

Another object of this invention is to provide in a switching apparatus a well for the switching fluid made up of a plurality of alternately stacked contact members and insulating spacers bonded together with a thermoplastic resinous material.

A more specific object of this invention is to provide in a switching apparatus a well for the switching fluid made up of a plurality of alternately stacked contact members and insulating spacers bonded together with a thermoplastic resinous material, the spacers being of a form to prevent the flow of the bonding material to the well.

Other objects of this invention will become apparent from the following description when taken in conjunction with the accompanying drawings, in which:

Figure 1 is a view in elevation of the switching apparatus of this invention;

Fig. 2 is a view in section of the switching apparatus of Fig. 1;

Fig. 3 is a top plan view of the apparatus of this invention shown in Figs. 1 and 2;

Fig. 4 is a plan view of one of the conductor leaves employed in the switching apparatus;

Fig. 5 is a plan view of a part of one of the spacer members embodied in the switching apparatus of this invention;

Fig. 6 is a view in section of the spacer member taken along the line VI—VI of Fig. 5;

Fig. 7 is a plan view of another part of the spacer member which cooperates with the part shown in Figs. 5 and 6;

Fig. 8 is a view in elevation of a switching apparatus embodying a plurality of switching units operated from a common actuator as contemplated by this invention;

Fig. 9 is a top plan view of a gasket utilized in the apparatus of Fig. 8;

Fig. 10 is a side elevational view of a bracket utilized in mounting the switching apparatus of this invention on a panelboard or the like;

Fig. 11 is a top plan view of the base member employed in the apparatus of Fig. 8;

Fig. 12 is a side view in section of the base member of Fig. 11; and

Fig. 13 is a view in section of a part of the apparatus of Fig. 8.

Referring to the drawings and particularly Figs. 1 and 2, this invention is illustrated by reference to a switching apparatus 10 formed from a suitable base member 12 on which a plurality of conductor members or leaves 14 are stacked in spaced relation and maintained in spaced relation by means of a plurality of spacer members 16 disposed adjacent the conductor leaves. A suitable container or chamber 18 is positioned at the end of the stacked conductor leaves 16 opposite the base member 12, the purpose of which will be explained more fully hereinafter.

The conductor members 14 utilized in this invention may be of any suitable conducting material, such as thin strips of stainless steel or the like, and as illustrated in Fig. 4, are of a substantially rectangular shape having one end tapered for providing a narrow terminal or tap 20 to which leads (not shown) may be connected. In practice, the conductor members 14 are stacked on the base member 12 alternately with the spacer members 16 and so positioned thereon that as the unit is stacked, the terminal or tap 20 of each succeeding leaf 14 extends outwardly from a different side of the assembly as the unit is constructed. By referring to Fig. 3, it is seen that every fifth conductor member is so reversed that the tapered terminal 20 extends from the stack in a reversed direction, thus giving eight stacks of staggered conductor terminals or lugs extending outwardly from the unit.

The spacer members 16 are preferably formed from a plurality of elements as shown in Figs. 5, 6 and 7. The composite spacer member 16 comprises two washer members 22 and 24 of fibrous insulating material, as shown in Figs. 5 and 7, the washers 22 and 24 being of different size for fitting one within the other. Both of the washer members 22 and 24 are of substantially the same thickness and are so designed as to maintain the desired spacing between the conductor leaves 14 with which they are associated.

In a preferred embodiment of this invention, the washer 22 is impregnated with or carries a film of a thermoplastic resinous bonding material, such as a hydrolyzed polyvinyl ester, the bond preferred being a vinyl partially hydrolyzed vinyl acetate. This thermoplastic resinous material is employed for sealing the conductor members 14 to the spacer members 16 and gives a leakproof structure when bonded thereto. The washer 24 of the spacer member 16 is preferably free from the thermoplastic bonding material and in the preferred embodiment is provided with burrs 26 at its outer edge, the burrs extending outwardly substantially perpendicular to the faces of the washer. These burrs effectively limit the flow of the thermoplastic resinous bonding material from the washer 22 to the central opening 28 in the washer 24 when the seal is being perfected.

Each of the conductor members or leaves 14 is provided with a central opening 30 for cooperating with the central opening 28 in the washer 24 when assembled in stacked relation with the spacer members to form a well in the stacked assembly. The edge or side wall of the opening 30 thus provides a continuous contact surface in each of the leaves 14. In addition to the central opening 30, each of the conductor leaf members 14 is also provided with a plurality of spaced openings 32 which cooperate with the spaced openings 34 of the washer 22 for forming aligned openings for receiving guide members 36 in facilitating the assembly of the unit. The guide members 36 illustrated in Fig. 2 are preferably of fibrous insulating material and are seated in spaced recesses 38 formed in the base member 12 and disposed to extend through the stack into spaced recesses 40 formed in the chamber 18 which is disposed at the other end of the stacked assembly. In practice, a spacer member 16 formed of the washers 22 and 24 is disposed at each end of the stacked assembly adjacent each of the base member 12 and the chamber 18.

The chamber 18 is formed of any suitable material with a space 42 therein for receiving gas or mercury as will be explained more fully hereinafter and preferably has inwardly sloped side walls 44 extending downwardly to an opening 46 which is in alignment with the well formed by the stacked assembly of conductor members and spacer members. The top or cover 43 of the container 18 seats on the side walls as illustrated, a gasket 48 being provided between the contacting faces of the cover and side walls. The gasket 48 is preferably of fibrous insulating material impregnated with, or carrying a film of, the thermoplastic resinous bonding material similar to the bonding material carried by the washer 22. As initially assembled, the chamber 18 is formed with a duct 50 leading through its cover member, the purpose of which will be explained more fully hereinafter.

The base member 12 is fabricated from any suitable material which is not affected by mercury. Steel or thermosetting plastics or the like may be used. The base member is preferably an elongated member provided with a flange 52 near its upper end. A recess or opening 54 is provided in the upper end of the base member 12 and is disposed to be in alignment with the well formed by the stacked assembly of conductor leaves 14 and spaced members 16. In addition to the recess or opening 54, a plurality of ducts 56 is provided extending from the recess 54 downwardly through the base member 12 to open at its external surface below the flange member 52.

Associated with the base member 12 is a bellows 58 having an annular flange member 60 secured about its upper end as by means of a weld. The flange member 60 is of a size to cooperate with the flange member 52 for securing the bellows 58 to the base member 12. The bellows 58 may be of any suitable material and is preferably formed having thin side walls so that it can be actuated through the application of a very small force thereto. As illustrated in Fig. 2, the bellows 58 is positioned about the lower end of the elongated base member 12, the base member cooperating with the bellows 58 for reducing the free space between the bellows and the base member. In practice, a gasket 62 of fibrous material impregnated with or carrying a thermoplastic resinous bonding material, such as the partially hydrolyzed vinyl acetate, is disposed between the flange members 52 and 60 of the base member 12 and bellows 58, respectively, for obtaining a leakproof seal at the joint.

When the switching apparatus 10 described hereinbefore is assembled, it is preferably placed in an oven and baked at a temperature of about 120° C. to effect the bonding of the conductor members, spacer members, base members and chamber as an integral unit. In sealing the elements of the apparatus, pressure of about 400 pounds per square inch is applied to the stacked assembly in any desirable manner.

An examination of switching units thus bonded under heat and pressure and in which the partially hydrolyzed vinyl acetate is employed as the bonding medium reveals that very tight seals are obtained between the bonded parts of the assembly. Further, the resinous bonding material carried by the washer 22 effectively flows between any slight cracks which might be present between the washers 22 and 24 to bond the outer edge of the washer 24 securely to the assembly, thereby maintaining the washer 24 in position with respect to the central openings of the conductor leaves 14. The burrs 26 carried at the edge of washer 24 are substantially flattened under the bonding pressure but still retain sufficient form to limit the flow of the bonding material. In addition, it is found that the resinous bonding material also fills any space around the guiding members 36 and securely bonds the guide members into the stacked assembly. The guide members 36 thereafter function as holding members, re-enforcing the bonded structure against mechanical shock.

After the stacked assembly is bonded into an integral unit, the space between the base member 12 and bellows 58, the well and the space 42 in the container or chamber 18 is evacuated through the duct 50. A predetermined quantity of liquid conducting material, such as mercury, is then introduced into the assembly through the duct 50. Because of the sloped surfaces 44 in the container or chamber 18, retension of any of the mercury in the chamber 18 is impossible when the assembly is in a vertical position, the mercury flowing from the container 18 through the well and ducts 56 to the space formed between the base member 12 and the bellows 58. After the mercury is introduced into the assembly, a gas capable of reducing arcing, such as hydrogen, is admitted to the chamber 18 and the well formed in the stacked assembly above the mercury. The chamber 18 is then sealed off by any suitable means such as by soldering or welding the duct 50.

With the assembly formed in this manner, it is found that the slight movement occasioned by reason of pressure being applied to the bellows 58 results in a very large movement of the mercury the level of which is indicated by the dotted line 59 upwardly through the ducts 56 and the well to progressively bridge the conductor members 14. If sufficient movement of the bellows 58 is encountered, the mercury is forced upwardly into the space 42 of the chamber 18, the gas enclosed in the chamber 18 functioning to cushion the force of the mercury within the container. Even though the mercury be forced into the container 18 under predetermined conditions by pressure applied to and effecting a movement of the bellows, its return to the well is insured by reason of the sloped surfaces 44 within the container 18 when the pressure is released and the movement of the bellows 58 is reversed. With this apparatus, a large number of switching operations may be accomplished with very little movement of the apparatus and with a very small peice of switching apparatus, since the conductor members 14 are so arranged and staggered as to require a very small space for the whole assembly.

As illustrated in Fig. 8, a plurality of units 64, 66 and 68 formed from the staggered assembly of conductor members 14 and spacer members 16 and the chambers 18 described hereinbefore are assembled on a common base member 70 and disposed to be operated by movement of a common bellows 72. In this embodiment, the units 64, 66 and 68 of the staggered leaves and spacer members are formed in the same manner described with reference to Figs. 1 and 2, the staggered assemblies being formed, however, on the base member 70 more clearly illustrated in Figs. 11 and 12.

The base member 70 is preferably elongated being formed of the same material as the base member 12 and is provided with a plurality of recesses or openings 74, 76 and 78 for cooperating with the wells in the units 64, 66 and 68, respectively. The recesses 74 and 78 are connected by ducts 80 and 82 to an enlarged opening 84 which also communicates with the opening 72.

A downwardly depending cylindrical member 86 having a flange 87 about its upper edge as illustrated in Fig. 13 is provided for assembly with the base member 70 and has an opening or recess 88 therein for cooperating or communicating with the enlarged opening 84 formed in the base member. Ducts 90 and 92 are provided in the member 86 extending downwardly from the opening 88 and outwardly to the external surfaces of the member 86. In assembling the depending member 86 with the base member 70, a gasket 94 is disposed between the base member 70 and the member 86. The gasket 94 illustrated in Fig. 9 is preferably of fibrous material and is provided with an elongated opening 96 for cooperating with the opening 84 in the base member. In practice the gasket 94 is impregnated with or carries a film or thermoplastic bonding material for effecting a leakproof seal between the members when they are assembled.

As in Fig. 2, the bellows 72 illustrated in Fig. 8, is provided with a flange member 60 for cooperating with the flange member 87 carried by the depending member 86, the depending member 86 projecting into the bellows 72 for reducing the free space therein available for holding the mercury. The volume of mercury within the bellows is therefore reduced with the result that temperature errors caused by expansion or contraction of the mercury are reduced to a minimum. The bellows 72 is preferably sealed to the base member in the same manner described with reference to the structure shown in Fig. 2.

After the units mounted on the common base 70 are evacuated and the arc reducing gas is introduced into the assembly, it is found that the switching apparatus embodying the plurality of units functions in the same manner as the apparatus shown in Fig. 2. When pressure is applied to the bellows 72, the mercury is forced through the ducts 92 and 90 into the enlarged opening 84 of the base member 70 and flows through the ducts 80 and 82 and the opening 76 to the well in each of the units 64, 66 and 68 to progressively bridge the spaced conductor leaves, thus giving three simultaneous switching operations for any given movement of the single bellows.

The switching apparatus of this invention may be mounted on a panelboard or the like by any suitable means, a preferred support 98 being shown in Fig. 10. The support 98 comprises a substantially U-shaped bracket having inwardly turned ends 100 for fitting under the flange 60 carried by the bellows 72 or 58 an opening 102 being provided in the base of the bracket. When positioned about the bellows 58 or 72, the opening 102 of the bracket 98 permits an actuating member (not shown) to contact the base of the bellows and apply pressure directly thereto to effect a movement of the mercury column within the switching apparatus. One of the legs of the bracket 98 may be secured directly to a panel or the like, such as by means of bolts (not shown).

Instead of the supporting bracket 98, the base member 70 of the apparatus shown in Fig. 8 may be secured to a panel or the like by means of bolts (not shown) secured to the base member through the openings 104 illustrated in Fig. 12. Regardless of the manner in which the switching apparatus is carried by a panel, it is preferred that the switching apparatus be so supported that the well in the switching apparatus is always in a substantially vertical position.

The switching apparatus of this invention is very efficient, slight movement of the bellows effecting a large number of switching operations. Further, the apparatus of this invention is capable of carrying relatively large currents since the conductor leaves are in effect heavy terminals and because they are staggered as shown and described, permit large conductors to be attached thereto even though the conductor members are fairly closely arranged.

Although this invention has been described with reference to a particular embodiment thereof, it is, of course, not to be limited thereto except insofar as is necessitated by the scope of the appended claims.

I claim as my invention:

1. In a switching apparatus, a plurality of switching units, a base member for supporting the switching units in spaced relation, each of the switching units comprising a plurality of conductor members disposed in spaced relation, a plurality of insulating spacer members stacked alternately with the conductor members, a thermoplastic resinous material applied to bond the conductor members and the spacer members into a sealed integral structure, each of the conductor members and the spacer members having an opening therein aligned to provide a well, a bellows disposed on and sealed to the base member, the base member having ducts disposed therein for providing a passageway from the bellows to the well in each of the switching units, and a liquid carried in the bellows, the liquid being a good electrical conductor, the bellows being disposed for operation to simultaneously deliver the conducting liquid into each of the wells to simultaneously progressively bridge the conductor members of each of the switching units.

2. In a switching apparatus, a plurality of switching units, a base member for supporting the switching units in spaced relation, each of the switching units comprising a plurality of conductor members disposed in spaced relation, a plurality of insulating spacer members stacked alternately with the conductor members, a thermoplastic resinous material applied to bond the conductor members and the spacer members into a sealed integral structure, each of the conductor members and the spacer members having an opening therein aligned to provide a well, a chamber disposed at the end of each of the stacked assembly communicating with the well therein, the chamber being sealed to its associated stacked assembly, a bellows disposed on and sealed to the base member, the base member having ducts disposed therein for providing a passageway from the bellows to the well in each of the switching units, a liquid carried in the bellows, the liquid being a good electrical conductor, the bellows being disposed for operation to simultaneously deliver the conducting liquid into each of the wells to simultaneously progressively bridge the conductor members of each of the switching units, and a gas capable of reducing arcing carried in the chamber and well of each of the switching units above the conducting liquid.

3. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well for receiving the conducting medium, a thermoplastic resinous material carried by the spacer members for bonding the conductor members and spacer members to prevent leakage therebetween to and from the well, and means carried by the spacer members to prevent the flow of the bonding material to the well.

4. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well for receiving the conducting medium, a thermoplastic resinous material carried by the spacer members for bonding the conductor members and spacer members to prevent leakage therebetween to and from the well, the resinous material being a partially hydrolized vinyl acetate, and means carried by the spacer members to prevent the flow of the bonding material to the well.

5. In a sealed switching apparatus provided with a liquid conducting medium for effecting a switching operation, in combination, a plurality of elongated conductor members disposed in spaced relation, a plurality of insulating spacer members stacked alternately with the conductor members, each of the conductor members and the spacer members having an opening therein aligned to provide a well for receiving the conducting medium, the conductor members being disposed to extend radially and in progressively different directions from the stack when the openings are aligned to facilitate the making of connections thereto, a thermoplastic resinous material carried by the spacer members for bonding the conductor members and spacer members to prevent leakage therebetween to and from the well, and means carried by the spacer members to prevent the flow of the bonding material to the well.

6. In a sealed switching apparatus provided with a liquid conducting medium for effecting a switching operation, in combination, a plurality of conductor members having an opening therein disposed in spaced relation, a plurality of insulating spacer members stacked alternately with the conductor members, each of the spacer members comprising two washers of different size formed from fibrous material and fitting one within the other, the smaller washer having an opening aligned with the openings in the conductor members to provide a well for receiving the conducting medium, a thermoplastic resinous material carried by the larger washer bonding the conductors and the spacer members into an integral structure, and means carried by the smaller washer to prevent the flow of the bonding material to the well, the bonding material sealing the spacer members and conductor members to prevent leakage through the side walls of the well.

7. In a sealed switching apparatus provided with a liquid conducting medium for effecting a switching operation, in combination, a plurality of conductor members disposed in spaced relation, a plurality of insulating spacer members stacked alternately with the conductor members and terminating the stack, each of the conductor members and the spacer members having an opening therein aligned to provide a well for receiving the conducting medium, a closed chamber disposed at one end of the stack and communicating with the well for receiving the liquid conducting medium under predetermined conditions, a thermoplastic resinous material carried by the spacer members for bonding the conductor members, the spacer members and the chamber into an integral unit and prevent leakage through the stack to the well, and means carried by the spacer members to prevent the flow of the bonding material to the well.

8. In a sealed switching apparatus provided with a liquid conducting medium for effecting a switching operation, in combination, a plurality of conductor members disposed in spaced relation, a plurality of insulating spacer members stacked alternately with the conductor members and terminating the stack, each of the conductor members and the spacer members having an opening therein aligned to provide a well for receiving the conducting medium, a closed chamber disposed at one end of the stack and communicating with the well for receiving the liquid conducting medium under predetermined conditions, means within the chamber disposed to insure return of the conducting liquid to the well under other conditions, a thermoplastic resinous material carried by the spacer members for bonding the conductor members, the spacer members and the chamber into an integral unit and prevent leakage through the stack to the well, and means carried by the spacer members to prevent the flow of the bonding material to the well.

9. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well for receiving the conducting medium, a thermoplastic resinous material carried by the spacer members for bonding the conductor members and spacer members to prevent leakage therebetween to and from the well, and a dam associated with each of the spacer members disposed to seat against the adjacent conductor members to prevent the flow of the bonding material to the well.

10. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well for receiving the conducting medium, a thermoplastic resinous material carried by the spacer members for bonding the conductor members and spacer members to prevent leakage therebetween to and from the well, and a deformable member carried by each of the spacer members disposed to seat against the adjacent conductor members to prevent the flow of the bonding material to the well.

11. In a sealed switching apparatus provided with a liquid conducting medium for effecting a switching operation, in combination, a plurality of conductor members disposed in spaced relation, a plurality of insulating spacer members stacked alternately with the conductor members, each of the conductor members and the spacer members having an opening therein aligned to provide a well for receiving the conducting medium, a thermoplastic resinous material carried by the spacer members for bonding the conductor members and spacer members to prevent leakage therebetween to and from the well, the resinous material being a partially hydrolized vinyl acetate, and a deformable member carried by each of the spacer members disposed to seat against the adjacent conductor members to prevent the flow of the bonding material to the well.

12. In a sealed switching apparatus provided with a liquid conducting medium for effecting a switching operation, in combination, a plurality of conductor members disposed in spaced relation, a plurality of insulating spacer members stacked alternately with the conductor members and terminating the stack, each of the conductor members and the spacer members having an opening therein aligned to provide a well for receiving the conducting medium, a closed chamber disposed at one end of the stack and communicating with the well for receiving the liquid conducting medium under predetermined conditions, a thermoplastic resinous material carried by the spacer members for bonding the conductor members, the spacer members and the chamber into an integral unit and prevent leakage through the stack to the well, and means comprising a dam carried by each of the spacer members in spaced relation to the opening therein disposed to prevent the flow of the bonding material to the well.

13. In a sealed switching apparatus provided with a liquid conducting medium for effecting a switching operation, in combination, a plurality of conductor members disposed in spaced relation, a plurality of insulating spacer members stacked alternately with the conductor members and terminating the stack, each of the conductor members and the spacer members having an opening therein aligned to provide a well for receiving the conducting medium, a closed chamber disposed at one end of the stack and communicating with the well for receiving the liquid conducting medium after predetermined conditions, a thermoplastic resinous material carried by the spacer members for bonding the conductor members, the spacer members and the chamber into an integral unit and prevent leakage through the stack to the well, and a deformable member carried by each of the spacer members disposed to seat against the members adjacent thereto to prevent the flow of the bonding material to the well.

14. In a sealed switching apparatus provided with a liquid conducting medium for effecting a switching operation, in combination, a plurality of elongated conductor members disposed in spaced relation, a plurality of insulating spacer members stacked alternately with the conductor members, each of the conductor members and the spacer members having an opening therein aligned to provide a well for receiving the conducting medium, the conductor members being disposed to extend radially and in progressively different directions from the stack when the openings are aligned to facilitate the making of connections thereto, a thermoplastic resinous material carried by the spacer members for bonding the conductor members and spacer members to prevent leakage therebetween to and from the well, the thermoplastic resinous material being a partially hydrolized vinyl acetate, and means carried by the spacer members to prevent the flow of the bonding material to the well.

15. In a sealed switching apparatus provided with a liquid conducting medium for effecting a switching operation, in combination, a plurality of conductor members having an opening therein disposed in spaced relation, a plurality of insulating spacer members stacked alternately with the conductor members, each of the spacer members comprising two washers of different size formed from fibrous material and fitting one within the other, the smaller washer having an opening aligned with the openings in the conductor members to provide a well for receiving the conducting medium, a thermoplastic resinous material carried by the larger washer bonding the conductors and the spacer members into an integral structure, the resinous material being a partially hydrolized vinyl acetate, and means carried by the smaller washer to prevent the flow of the bonding material to the well, the bonding material sealing the spacer members and conductor members to prevent leakage through the side walls of the well.

16. In a sealed switching apparatus provided with a liquid conducting medium for effecting a switching operation, in combination, a plurality of conductor members having an opening therein disposed in spaced relation, a plurality of insulating spacer members stacked alternately with the conductor members, each of the spacer members comprising two washers of different size formed from fibrous material and fitting one within the other, the smaller washer having an opening aligned with the openings in the conductor members to provide a well for receiving the conducting medium, a thermoplastic resinous material carried by the larger washer bonding the conductors and the spacer members into an integral structure, and a deformable portion carried by the smaller washer disposed to seat against the members adjacent the spacer members to prevent the flow of the bonding material to the well, the bonding material sealing the spacer members and conductor members to prevent leakage through the side walls of the well.

KIRK A. OPLINGER.